United States Patent
Fan et al.

(10) Patent No.: US 6,779,458 B1
(45) Date of Patent: Aug. 24, 2004

(54) METHOD AND APPARATUS FOR INSTALLING AFT INSULATION IN ROCKET MOTOR CASE

(75) Inventors: Jun-Ling Fan, Tao-Yuan (TW); Hsing-Tsai Huang, Tao-Yuan (TW)

(73) Assignee: Chung-Shan Institute of Science & Technology, Tao-Yuan (TW)

(*) Notice: Subject to any disclaimer, the term of this patent is extended or adjusted under 35 U.S.C. 154(b) by 0 days.

(21) Appl. No.: 10/702,494

(22) Filed: Nov. 7, 2003

(51) Int. Cl.[7] .................................................. C06D 5/00
(52) U.S. Cl. ........................................................ 102/290
(58) Field of Search ................................. 102/290, 289; 60/253

(56) References Cited

U.S. PATENT DOCUMENTS

| | | | | |
|---|---|---|---|---|
| 3,347,047 A | * | 10/1967 | Hartz et al. | 60/253 |
| 3,421,965 A | * | 1/1969 | Brown et al. | 156/423 |
| 4,304,185 A | * | 12/1981 | Sayles | 102/290 |
| 4,501,841 A | * | 2/1985 | Herring | 524/411 |
| 4,507,165 A | * | 3/1985 | Herring | 156/191 |
| 4,878,431 A | * | 11/1989 | Herring | 102/290 |
| 5,212,946 A | * | 5/1993 | Hans et al. | 60/253 |

* cited by examiner

Primary Examiner—Charles T. Jordan
Assistant Examiner—Jordan Lofdahl
(74) Attorney, Agent, or Firm—Bacon & Thomas PLLC

(57) ABSTRACT

A method and an apparatus are devised to install an insulation rubber loop in the aft end of a rocket motor case. The method includes the making of a rubber strip into a rubber loop by casting. The rubber loop is partially cured and is then adhered to the inner wall of the aft end of the rocket motor case by using a silicone rubber loop of the apparatus. The silicone rubber loop is caused to deform so as to press against the insulation rubber loop, which is thus securely attached to the inner wall of the aft end of the rocket motor case. The attachment of the rubber loop is further enhanced by heating the rocket motor case to provide heat which is intended to facilitate the curing of the rubber loop.

5 Claims, 1 Drawing Sheet

METHOD AND APPARATUS FOR INSTALLING AFT INSULATION IN ROCKET MOTOR CASE

FIELD OF THE INVENTION

The present invention relates generally to an insulation technology of a solid rocket motor case, and more particularly to an installation method and an installation apparatus, by which an insulation is adhered to the inner wall near the aft end of the solid rocket motor case.

BACKGROUND OF THE INVENTION

The propellant used to propel a solid rocket is formed of a plurality of high-energy fuels, oxidizers, and binders. The propellant, when ignited, produces hot gases that spurt from the nozzle of the rock and drive the rocket forward. The hot gases produced in the solid rocket motor have a high temperature ranging from 2400° C. to 3700°C. The structural integrity of the rocket motor case is therefore vulnerable to impairment by such a high heat energy that is accumulated over a period of time within a limited space of the rocket motor case. For this reason, the motor case of various rockets is provided with an insulation device to safeguard the rocket motor case.

The insulation of the rocket motor case is attained in general by means of thin rubber sheet, polymer paste, and coating material. In light of easy installation of the thin rubber sheet, it is widely used to insulate the rocket motor case of a large or medium-sized ballistic or guided missile.

The U.S. Pat. Nos. 4,304,185; 3,347,047; 4,507,165; 4,501,841; and 4,878,431 disclose various preparations of rocket motor case insulation materials in the form of rubber coating or strip. These insulation materials are adhered to the inner wall of a rocket motor case by a specific mechanical method. In the case of the insulation materials in the form of the rubber coating or paste, the adhesion of the rubber coating or paste is attained respectively by spray coating or paring. As far as the application of the rubber strip is concerned, the adhesion of the rubber strip is achieved by various methods, such as inflatable mandrel technique, molding technique, manual lay-up technique, strip winding technique, etc.

In view of the fact that the aft end of a rocket motor case is provided with a nozzle section, the insulation of the rocket motor case poses a technical problem. The nozzle section of the rocket motor case has an inner diameter which is abruptly reduced, thereby resulting in a steep increase in pressure of hot gases produced by combustion of the rocket propellant. As a remedial measure, the thickness of the insulation located at the aft end of the rocket motor case is appropriated increased. In light of the geometrical change in profile of the aft end in relation to the motor case, the technical difficulties involving the insulation adhesion of the aft end of the rocket motor case is further compounded. For example, the insulation material cannot be securely adhered to the curved portions of the rocket motor case by the conventional manual lay-up technique. In addition, such conventional technique often results in the left-over of gas bubble residue between the insulation and the inner wall of the rocket motor case.

SUMMARY OF THE INVENTION

With the purpose of overcoming the deficiencies of the prior art methods described above, it is the primary objective of the present invention to provide a novel apparatus which is designed to adhere securely an insulation to the aft end of a rocket motor case. By using the apparatus of the present invention, an pre-molded insulation loop can be precisely located at the aft end of the rocket motor case. The insulation loop is formed by casting and is partially cured. Upon having been located at the aft end of the rocket motor case, the partially-cured insulation loop is exerted on by a pressure before it is subjected to a heat treatment to bring about the post-curing of the insulation loop. The insulation loop is thus securely attached to the inner wall of the rocket motor case.

It is another objective of the present invention to provide a novel method of installing an insulation in the aft end of a rocket motor case. The method of the present invention involves a first step in which a rubber strip is made into a rubber loop by casting. The rubber loop so made is then partially cured. The partially-cured rubber loop is adhered to the inner wall of the aft end of the rocket motor case. Thereafter, the insulation rubber loop is pressed and heated to bring about the post-curing of the insulation rubber loop and the attaching of the insulation rubber loop to the inner wall of the aft end of the rocket motor case. The cured insulation rubber loop installed by the method of the present invention is relatively effective in providing the rocket motor case with protection against the thermal breakdown or deformation of the rocket motor case.

It is appropriate to describe in detail here the advantages of the present invention over the prior art methods described above. The most simple and feasible method of the prior art is the manual lay-up technique, which has a serious drawback attributable to the property of a material of which the insulation is made, and the dimension of the rocket motor case. For example, an insulation material containing a large amount of fiber tends to have a greater toughness, which is the culprit of the technical difficulty of the manual lay-up technique of the prior art. As far as the dimension of the rocket motor case is concerned, it is conceivably difficult for a worker to install the insulation in the rocket motor case of a small dimension. In addition, it is uncomfortable and even hazardous for a worker to install the insulation in a confined workplace. The quality of the work done by the worker in such a hazardous environment is therefore subject to scrutiny.

According to the present invention, the casting and the partial curing of the insulation material are done outside a rocket motor case. The partially cured insulation has a fixed form and hardness, thereby making the insulation less vulnerable to deformation in the course of installation of the insulation.

The prior art methods are further handicapped by the fact that the insulation installation cannot be done easily and effectively in the aft section of a rocket motor case, due to a relatively small diameter and a curved profile of the aft section. In the course of a manual installation of the insulation in the aft section, it is difficult for a worker to apply a pressure evenly on the insulation to against the inner wall of the aft section in a consistent manner. As a result, air bubbles are bound to be trapped between the insulation and the inner wall of the motor case. The air bubble residue undermines the adhesion at the interface of the insulation and the inner wall of the aft section. The char forming insulation at a high temperature is susceptible to being stripped off the inner wall of the aft section by the strong gas flow that is produced as a result of combustion of the rocket propellant.

The present invention averts the trapping of air bubbles at the interface of the insulation and the inner wall of the aft section, thanks to the apparatus of the present invention by which a silicone rubber block is used to press a precast insulation rubber loop that has already been properly located. The insulation is therefore secured to the inner wall of the aft section. It is therefore readily apparent that the present invention is efficient and cost-effective.

The features and the advantages of the present invention will be more readily understood upon a thoughtful deliberation of the following detailed description of a preferred embodiment of the present invention with reference to the accompanying drawing.

DETAILED DESCRIPTION OF THE PREFERRED EMBODIMENT

Figure 1:
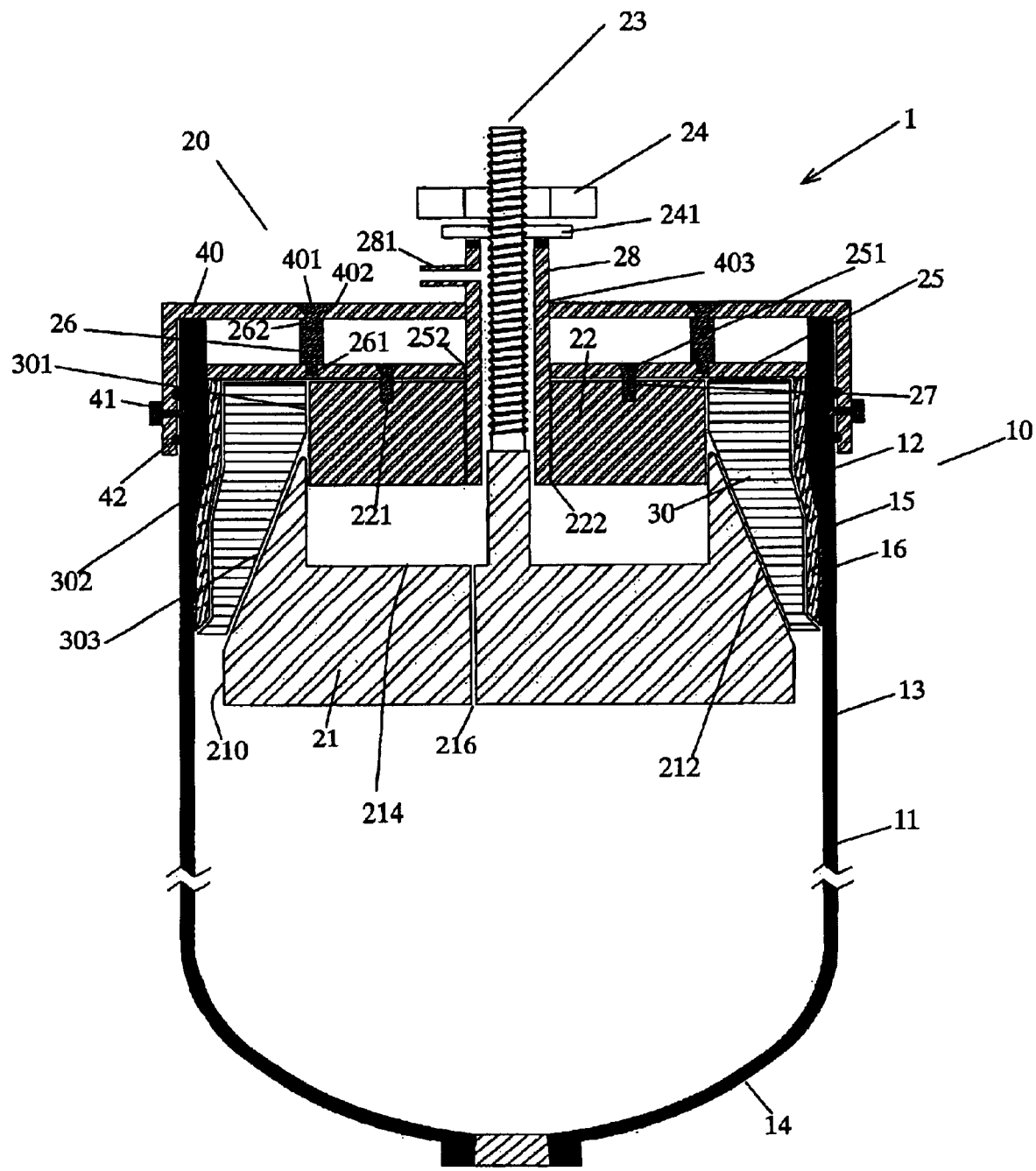
FIG. 1 shows a sectional schematic view of an apparatus of the preferred embodiment of the present invention.

The present invention provides an apparatus for installing an insulation rubber loop to the aft end of a rocket motor case, wherein said insulation rubber loop is attached to an inner wall of sad rocket motor case, said apparatus comprising:

a cover to be fastened to an opening of the aft end of the rocket motor case;

a first metal block movably joined with said cover and provided with a conical portion having a small end and a large end, with said small end being located in proximity of said cover, wherein said first metal block is able to be driven such that said small end to move vertically toward or away from said cover; and a heat-resistant rubber loop corresponding in shape to the insulation rubber loop and having a conical inner edge corresponding in shape to said conical portion of said first metal block, said conical inner edge of said heat-resistant rubber loop being located on said conical portion of said first metal block, said heat-resistant rubber loop having an outer edge in an intimate contact with the insulation rubber loop at such time when said first metal block is located in the rocket motor case and when said cover is fastened to the opening of the aft end of the rocket motor case, the insulation rubber loop being pressed against said inner wall of sad rocket motor case by said heat-resistant rubber loop such that the insulation rubber loop is securely attached to the inner wall of the aft end of the rocket motor case at such time when said first metal block is driven to move toward said cover; wherein said heat-resistant rubber loop and said first metal block are able to taken out of the rocket motor case from the opening of the aft end of the rocket motor case by being put through the insulation rubber loop at the time when said first metal block is driven to move away from said cover and in the wake of said cover being separated from the opening of the aft end of the rocket motor case.

Preferably, the apparatus of the present invention further comprising a threaded rod engaging said first metal block; a sleeve joined with said cover, said threaded rod being located along an axial direction of said conical portion such that said threaded rod extends into said sleeve, and that a portion of said threaded rod extends out of said cover; and a nut engaging the portion of said threaded rod whereby said nut is turned to drive said first metal block to move toward or away from said cover.

Preferably, the apparatus of the present invention further comprises a fastening steel plate fastened with said cover, and a second metal block fastened with said fastening steel plate, said fastening steel plate and said second metal block being located between said cover and said first metal block and being provided with a center hole dimensioned to accommodate said sleeve, said fastening steel plate having a diameter equal to or smaller than the opening of the aft end of the rocket motor case, said second metal block having a diameter equal to or smaller than an upright inner edge of said heat-resistant rubber loop, wherein said fastening steel plate is attached to a top of said heat-resistant rubber loop, and an outer circumference of said second metal block is attached to the upright inner edge of said heat-resistant rubber loop, when said heat-resistant rubber loop is placed on the conical portion of said first metal block, said cover is fixed at the opening of the aft end of the rocket motor case, and said nut is fastened to drive said first metal block to move toward said cover.

Preferably, said sleeve is provided with a ventilation device on a portion which extends out of said cover, said ventilation device being adapted to be connected to a vacuum pump; wherein said first metal block is provided with a vent, whereby said vacuum pump is able to draw air out of the rocket motor case at such time when said cover seals off the opening of the aft end of the rocket motor case.

Preferably, said heat-resistant rubber loop is a silicone rubber loop having a shore A hardness ranging from 50 to 60.

A method of installing an insulation rubber loop to the aft end of a rocket motor case according to the present invention comprises the following steps of:

(a) precasting a rubber strip into a rubber loop;
(b) curing the rubber loop in such a manner that the rubber loop is made into a partially cured rubber loop;
(c) adhering the partially cured rubber loop to an inner wall of the aft end of the rocket motor case; and
(d) pressing the partially cured rubber loop against the inner wall of the aft end of the rocket motor case and heating the rocket motor case to provide heat to facilitate the curing of the partially cured rubber loop, so that the partially cured rubber loop is post-cured and is securely adhereed to the inner wall of the aft end of the rocket motor case.

In the method of the present invention a means is provided in the step (d) to evacuate air or gas out of the rocket motor case such that the rocket motor case is completely exhausted of the air or gas.

Preferably, the partially cured rubber loop is pressed against by a silicone rubber loop having a Shore A hardness ranging from 50 to 60 in step (d).

The precasting of the insulation rubber loop of the present invention is done in accordance with the circumferential specifications of the aft end of a rocket motor case. In another words, a flat rubber sheet is prepared in accordance with the thickness and the width of the insulation, as well as the circumferential specifications of the aft end of the rocket motor case. Surfaces of a plurality of flat rubber sheets are wetted with a solvent of the rubber and then dried in the atmosphere. Thereafter, the flat rubber sheets are laminated and then pressed with a hand roller to force out air bubbles which might exist between two adjoining rubber sheets. Such a laminated structure is then caused to take form in a shaping tool, so as to become an insulation rubber strip. The insulation rubber strip is then provided at one end with an inclined plane having an inclination of 45 degrees and facing inward. The insulation rubber strip is further provided at other end with an inclined plane having an inclination of 45 degrees and facing outward. These two inclined planes are then provided with a solvent coating, by means of which both ends of the insulation rubber strip are held together such that the insulation rubber strip is made into a green insulation rubber loop. On the basis of the dimension of the green insulation rubber loop, a steel mold is made such that it is provided with a ventilation device for removing air contained in the green and the mold. The green insulation rubber loop is partially cured in the mold which is kept in the vacuum state and is heated by a hot press. The extent of the curing is determined by the Mooney viscometer, which is used to measure continuously the viscosity of the green insulation rubber loop from the onset of the reaction until it is completely cured. The viscosity variation can be expressed by a curve from a plot of increment in torque versus reaction time. On the basis of the reaction time corresponding to ¼, ⅓, or ½ portion of the curve, the degree of the curing of the blank, such as ¼, ⅓, or ½, can be determined. The partially cured insulation rubber loop of the present invention remains appropriately viscous and can be therefore easily attached to the inner wall of the rocket motor case. In addition, the partially cured insulation rubber loop is partially cross-linked and provided with a considerable hardness, thereby making it relatively easy to be installed. Upon having been removed from the mold, the partially cured insulation rubber loops are kept on standby in a storage free from stains.

As shown in FIG. 1, an apparatus 1 embodied in the present invention is used to exert an even pressure on a precast insulation rubber loop 16 which is located at an aft end 12 of a rocket motor case 11, thereby enabling the insulation rubber loop 16 to be adhered to the inner wall of the aft end 12 by means of an adhesive 15 under pressure and heat.

The apparatus 1 comprises the case 11 and a pressure assembly 20. The pressure assembly 20 is formed of two round blocks 21 and 22 of an aluminum alloy, a threaded rod 23, a nut 24, a silicone rubber loop 30, a fastening steel plate 25, and an end cover 40 of the case 11. The first aluminum alloy block 21 has a lower edge 210 with a diameter slightly smaller than the smallest portion of an inner diameter of the insulation rubber loop 16 which is already located, thereby allowing passage of the aluminum alloy block 21 through the insulation rubber loop 16. The aluminum alloy block 21 has an upper edge 212 which is provided with an inclined plane and is provided at a top with a recess 214. The second aluminum alloy block 22 has a diameter slightly smaller than a diameter of the recess 214 of the first aluminum alloy block 21, thereby enabling the second aluminum alloy block 22 to move freely in the recess 214 of the first aluminum alloy block 21. The second aluminum alloy block 22 is provided with a center round hole 222 dimensioned to allow the passage of the threaded rod 23 such that the threaded rod 23 is extended to reach the outside of the rocket motor case 11. The inclined plane of the upper edge 212 of the first aluminum alloy block 21 and the outer circumference of the second aluminum alloy block 22 are connected with inner edges 301 and 303 of a precast silicone rubber loop 30. The silicone rubber loop 30 has an outer edge 302 whose shape is dependent on the inner shape of the insulation rubber loop 16. The inclined edge 303 of the silicone rubber loop 30 extends outward and downward from the inside of the silicone rubber loop 30. The inclined edge 303 has an inclination of 45 degrees. The inclined edge 303 is corresponding in inclination and height to the inclined plane of the first aluminum alloy block 21. The silicone rubber loop 30 and the insulation rubber loop 16 are corresponding in height to each other. The fastening steel plate 25 is located over the second aluminum alloy block 22, the silicone rubber loop 30, and the insulation rubber loop 16. The fastening steel plate 25 has a diameter corresponding to an outer diameter of the portion of the insulation rubber loop 16 being contiguous to the aft end 12 of the rocket motor case. The fastening steel plate 25 is used to confine the movements of the second aluminum alloy block 22 and the silicone rubber loop 30. The fastening steel plate 25 is fastened securely on the end cover 40 by three connection rods 26, each having a length corresponding to a distance between the rearmost end of the insulation rubber loop 16 and the fringe of the aft end 12 of the motor case. The connection rods 26 are provided at one end with threads, which are engaged with a threaded hole 261 of the fastening steel plate 25. The connection rods 26 are provided at other end with a threaded hole 262, which is engaged with a screw 401 of the end cover 40. The second aluminum alloy block 22 is provided with threaded holes 221 and is fastened with the fastening steel plate 25 by screws 27 which are engaged with the threaded holes 221. The end cover 40 has an inner diameter corresponding to an outer diameter of the aft end 12 of the motor case. The end cover 40 is fastened with the aft end 12 by fastening screws 41 and is provided with an O-ring 42. The screws 41 is provided with a rubber washer (not shown in the drawing). As the end cover 40 is securely fastened by the screws 41, the motor case 11 is sealed off. The end cover 40 and the fastening plate 25 are provided in the center with a round hole 403 and 252 through which the threaded rod 23 is put. The center round holes 222, 252 and 403 of the second aluminum alloy block 22, the fastening plate 25 and the end cover 40 are identical in hole diameter and are greater in diameter than the threaded rod 23 which is provided with a sleeve 28 having an outer diameter corresponding to the hole diameter of the center round holes 222, 252 and 403 of the second aluminum alloy block 22, the fastening plate 25 and the end cover 40. The sleeve 28 has a lower end, which extends downwards such that the lower end is level with the lower edge of the second aluminum alloy block 22, with an upper end of the sleeve 28 extending through the end cover 40. The sleeve 28 is provided with threads by means of which the sleeve 28 is fastened with the end cover 40 in conjunction with a sealing tape. The sleeve 28 may also be fastened with the end cover 40 by welding. The sleeve 28 is provided at the upper end with a rubber washer 241 serving as sealer between the sleeve 28 and the threaded rod 23 at the time when the nut 24 is fastened. The upper portion of the sleeve 28 is further provided with a ventilation device 281 which is connected to a vacuum pump (not shown in the drawing) for removing air in the motor case 11 of a rocket motor 10. The first aluminum alloy block 21 is provided with a vent 216 for removing the gas in the motor case 11.

As the nut 24 is fastened, the first aluminum alloy block 21 is displaced upwards to press against the silicone rubber loop 30, which is thus deformed. The insulation rubber loop 16 is thus exerted on by a pressure. The motor case 11 is heated to bring about the curing of the insulation rubber loop 16 under pressure. In order to provide an appropriate pressure exerting on the insulation rubber loop 16 by the deformed silicone rubber loop 30, the silicone rubber loop 30 is made of a silicone rubber material having a hardness in the range of 50–60, which is measured by the Shore A hardness tester.

Prior to the installation of the insulation rubber loop 16 to the inner wall of the case 11 of the rocket motor 10, the inner wall of the case 11 must be so cleaned that the rust is removed by sand blasting, and that the grease is removed by means of solvent cleaning. As soon as the solvent is completely dried, the inner wall of the motor case 11 is provided with a coating of an adhesive 15, The selection of the adhesive 15 is dependent on the property of a rubber material of which the insulation rubber loop 16 is made. For example, the insulation rubber loop 16 is made of NBR rubber, the adhesive 15 should be Chemlock 234. If the insulation rubber loop 16 is made of EPDM rubber material, the adhesive should be Chemlock 238.

The outer side of the partially cured insulation rubber loop 16 is provided with a coating of the adhesive 15. The solvent of the adhesive is dried at room temperature. The insulation rubber loop 16 is located in the aft end 12 of the motor case 11 of the rocket motor 10. The first aluminum alloy block 21 is inserted into the motor case 11 via an opening of the aft end 12 such that the threaded rod 23 provided on the first aluminum alloy block 21 is held in the outside of the motor case 11. The silicone rubber loop 30 is placed on the inclined edge 212 of the first aluminum alloy block 21 such that the silicone rubber loop 30 is located at the inner side of the insulation rubber loop 16. Thereafter, the assembly of the second aluminum alloy block 22, the fastening plate 25 and the end cover 40 is carefully mounted on the motor case 11 of the rocket motor 10 such that the second aluminum alloy block 22 is inserted into the recess 214 of the first aluminum alloy block 21. This process can be also carried out in a piecemeal manner. In the wake of having located the aluminum alloy block 21, the silicone rubber loop 30, and the fastening plate 25 together with the second aluminum alloy block 22, the connection rods 26 are subsequently fastened onto the fastening plate 25, so as to locate securely the end cover 40. The sleeve 28 is inserted into the second aluminum alloy block 22 with the threaded rod 23 extending through the sleeve 28. The screws 401 are engaged with the threaded holes 262 via the through holes 402 of the end cover 40, so that the connection rods 26 are connected with the end cover 40. After the end cover 40 is located, the screw 41 is fastened. The threaded rod 23 is provided with the rubber washer 241. The nut 24 is then fastened. The ventilation device 281 is connected with the vacuum pump (not shown in the drawing). The air/gas contained at the interface of the insulation rubber loop 16 and in the aft end 12 and other portions of the motor case 11 is drawn out via the hole 216 of the first aluminum alloy block 21. The nut 24 is fastened to pull the first aluminum alloy block 21 upward to press against the silicone rubber loop 30, which is thus deformed. In light of the silicone rubber loop 30 being confined by the aluminum alloy blocks 21 and 22, as well as the fastening plate 25 made of steel, the deformation of the silicone rubber loop 30 takes place only in a direction toward the insulation rubber loop 16. In another, the insulation rubber loop 16 is pressed against by the deformed silicone rubber loop 30. With the interior of the motor case 11 of the rocket motor 10 remaining in the vacuum state, the case motor 11 is heated externally to provide a heat to facilitate the curing of the insulation rubber loop 16. As the insulation rubber loop 16 is completely cured, it is securely adhered to the inner wall of the aft end 12 of the motor case 11. The heating of the case 11 is terminated. The insulation rubber loop 16 is cooled to room temperature. Finally, the apparatus of the present invention is dismantled from the rocket motor case 11.

The embodiment of the present invention described above is to be regarded in all respects as being illustrative and nonrestrictive. Accordingly, the present invention may be embodied in other specific forms without deviating from the spirit thereof. The present invention is therefore to be limited only by the scopes of the following claims.

What is claimed is:

1. An apparatus for installing an insulation rubber loop to the aft end of a rocket motor case, wherein said insulation rubber loop is attached to an inner wall of sad rocket motor case, said apparatus comprising:

a cover to be fastened to an opening of the aft end of the rocket motor case;

a first metal block movably joined with said cover and provided with a conical portion having a small end and a large end, with said small end being located in proximity of said cover, wherein said first metal block is able to be driven such that said small end to move vertically toward or away from said cover; and a heat-resistant rubber loop corresponding in shape to the insulation rubber loop and having a conical inner edge corresponding in shape to said conical portion of said first metal block, said conical inner edge of said heat-resistant rubber loop being located on said conical portion of said first metal block, said heat-resistant rubber loop having an outer edge in an intimate contact with the insulation rubber loop at such time when said first metal block is located in the rocket motor case and when said cover is fastened to the opening of the aft end of the rocket motor case, the insulation rubber loop being pressed against said inner wall of sad rocket motor case by said heat-resistant rubber loop such that the insulation rubber loop is securely attached to the inner wall of the aft end of the rocket motor case at such time when said first metal block is driven to move toward said cover; wherein said heat-resistant rubber loop and said first metal block are able to taken out of the rocket motor case from the opening of the aft end of the rocket motor case by being put through the insulation rubber loop at the time when said first metal block is driven to move away from said cover and in the wake of said cover being separated from the opening of the aft end of the rocket motor case.

2. The apparatus as defined in claim 1 further comprising a threaded rod engaging said first metal block; a sleeve joined with said cover, said threaded rod being located along an axial direction of said conical portion such that said threaded rod extends into said sleeve, and that a portion of said threaded rod extends out of said cover; and a nut engaging the portion of said threaded rod whereby said nut is turned to drive said first metal block to move toward or away from said cover.

3. The apparatus as defined in claim 2 further comprising a fastening steel plate fastened with said cover, and a second metal block fastened with said fastening steel plate, said fastening steel plate and said second metal block being located between said cover and said first metal block and being provided with a center hole dimensioned to accommodate said sleeve, said fastening steel plate having a diameter equal to or smaller than the opening of the aft end of the rocket motor case, said second metal block having a diameter equal to or smaller than an upright inner edge of said heat-resistant rubber loop, wherein said fastening steel plate is attached to a top of said heat-resistant rubber loop, and an outer circumference of said second metal block is attached to the upright inner edge of said heat-resistant rubber loop, when said heat-resistant rubber loop is placed on the conical portion of said first metal block, said cover is fixed at the opening of the aft end of the rocket motor case, and said nut is fastened to drive said first metal block to move toward said cover.

4. The apparatus as defined in claim 2, wherein said sleeve is provided with a ventilation device on a portion which extends out of said cover, said ventilation device being adapted to be connected to a vacuum pump; wherein said first metal block is provided with a vent, whereby said vacuum pump is able to draw air out of the rocket motor case at such time when said cover seals off the opening of the aft end of the rocket motor case.

5. The apparatus as defined in claim 1, wherein said heat-resistant rubber loop is a silicone rubber loop having a shore A hardness ranging from 50 to 60.

* * * * *